US011163749B2

(12) United States Patent
Helak et al.

(10) Patent No.: US 11,163,749 B2
(45) Date of Patent: *Nov. 2, 2021

(54) MANAGING MULTIPLE LOCKS FOR DATA SET MEMBERS IN A DATA SET INDEX

(71) Applicant: International Business Machines Corporation, Armonk, NY (US)

(72) Inventors: Dustin A. Helak, Elmhurst, IL (US); David C. Reed, Tucson, AZ (US); Thomas C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 741 days.

This patent is subject to a terminal disclaimer.

(21) Appl. No.: 15/802,444

(22) Filed: Nov. 2, 2017

(65) Prior Publication Data

US 2018/0060382 A1 Mar. 1, 2018

Related U.S. Application Data

(63) Continuation of application No. 14/964,854, filed on Dec. 10, 2015, now Pat. No. 9,940,348, which is a (Continued)

(51) Int. Cl.
*G06F 16/23* (2019.01)
*G06F 16/21* (2019.01)

(52) U.S. Cl.
CPC .......... *G06F 16/2365* (2019.01); *G06F 16/21* (2019.01); *G06F 16/2343* (2019.01)

(58) Field of Classification Search
CPC ... G06F 16/2365; G06F 16/21; G06F 16/2343
See application file for complete search history.

(56) References Cited

U.S. PATENT DOCUMENTS 4,965,719 A * 10/1990 Shoens .................... G06F 9/52
707/E17.007
5,062,038 A 10/1991 Jordan, Jr.
(Continued)

OTHER PUBLICATIONS

U.S. Appl. No. 13/619,962, filed Sep. 14, 2012 by D.L. Erdmann et al. (18.465).
(Continued)

*Primary Examiner* — Cam Y T Truong
(74) *Attorney, Agent, or Firm* — Konrad Raynes Davda & Victor LLP; David W. Victor

(57) ABSTRACT

Provided are a computer program product, system, and method for managing multiple locks for data set members in a data set index. The data set index has leaf nodes and internal nodes. In response to determining that a current lock is set at a locked node that prevents a grant to a requested lock, a determination is made as to whether there are different first and second descendant nodes from the locked node at a same level of the tree data structure linked to the requested data set member and the locked data set member, respectively. If so, the requested lock for the requested data set member is set at the first descendant node, the current lock is moved to the second descendant node for the locked data set member and the requested lock is granted.

20 Claims, 10 Drawing Sheets

Related U.S. Application Data continuation of application No. 13/959,658, filed on Aug. 5, 2013, now Pat. No. 9,262,463.

(56) References Cited

U.S. PATENT DOCUMENTS

| | | | | |
|---|---|---|---|---|
| 5,063,501 | A | * | 11/1991 | Jordan, Jr. .......... G06F 16/1774 710/200 |
| 5,119,490 | A | | 6/1992 | Kurose |
| 5,276,872 | A | * | 1/1994 | Lomet .................. G06F 16/2343 |
| 5,414,839 | A | * | 5/1995 | Joshi ....................... G06F 9/524 |
| 5,430,869 | A | | 7/1995 | Ishak et al. |
| 5,557,786 | A | | 9/1996 | Johnson, Jr. |
| 6,792,432 | B1 | | 9/2004 | Kodavalla et al. |
| 6,993,629 | B2 | | 1/2006 | Beardsley et al. |
| 7,539,988 | B1 | | 5/2009 | Hersh |
| 8,019,779 | B2 | | 9/2011 | Teng et al. |
| 8,589,652 | B2 | | 11/2013 | Belisle et al. |
| 9,262,463 | B2 | | 2/2016 | Helak et al. |
| 9,323,771 | B2 | | 4/2016 | Krishnamurthy |
| 2002/0059309 | A1 | * | 5/2002 | Loy ....................... G06F 16/148 |
| 2006/0004758 | A1 | * | 1/2006 | Teng .................. G06F 16/2343 |
| 2008/0086470 | A1 | * | 4/2008 | Graefe ................ G06F 16/2343 |
| 2013/0138896 | A1 | * | 5/2013 | McKenney ......... G06F 13/1663 711/147 |
| 2013/0204902 | A1 | | 8/2013 | Wang et al. |
| 2014/0082316 | A1 | | 3/2014 | Erdmann et al. |
| 2014/0310317 | A1 | * | 10/2014 | Spillane .............. G06F 16/9027 707/803 |
| 2015/0039575 | A1 | | 2/2015 | Helak et al. |
| 2016/0092498 | A1 | | 3/2016 | Helak et al. |

OTHER PUBLICATIONS

U.S. Appl. No. 13/959,658, filed Aug. 5, 2013, (18.499).
Office Action dated Jun. 11, 2015, pp. 15, for U.S. Appl. No. 13/959,658, filed Aug. 5 2013, (18.499).
Response dated Sep. 11, 2015, pp. 15, to Office Action dated Jun. 11, 2015, pp. 15, for U.S. Appl. No. 13/959,658, filed Aug. 5, 2013, (18.499).
Notice of Allowance dated Oct. 14, 2015, pp. 15, for U.S. Appl. No. 13/959,658, filed Aug. 5, 2013, (18.499).
U.S. Appl. No. 14/964,854, filed Dec. 10, 2015, (18.499C1).
Office Action dated Jan. 27, 2017, pp. 26, for U.S. Appl. No. 14/964,854, filed Dec. 10, 2015 (18.499C1).
Response dated Apr. 27, 2017, pp. 14, to Office Action dated Jan. 27, 2017, pp. 26, for U.S. Appl. No. 14/964,854, filed Dec. 10, 2015 (18.499C1).
Notice of Allowance dated Aug. 4, 2017, pp. 18, for U.S. Appl. No. 14/964,854, filed Dec. 10, 2015, (18.499C1).
List of IBM Patents or Patent Applications Treated as Related, dated Nov. 2017, pp. 2.

* cited by examiner

MANAGING MULTIPLE LOCKS FOR DATA SET MEMBERS IN A DATA SET INDEX

BACKGROUND OF THE INVENTION

1. Field of the Invention

The present invention relates to a computer program product, system, and method for managing multiple locks for data set members in a data set index.

2. Description of the Related Art

A partitioned data set extended (PDSE) is a data set having an index and zero or more members. When adding new data for a new or existing member, the new data is appended sequentially to the end of the PDSE.

The PDSE index may be implemented in a tree data structure where pages allocated to the PDSE data sets are assigned to implement internal nodes and leaf nodes representing the data set index. Each leaf node links to one or more members and provides information to access the member. Each internal node links to one or more further internal nodes or leaf nodes. When a user seeks to access a member, the member name is presented and the tree is traversed through the one or more internal nodes to the leaf node representing the requested member using the member name as the index key. Member data is only loaded into the memory when accessed.

When a data set is opened, the entire data set index is loaded into the memory by assigning pages to implement all the internal and leaf nodes used to represent the entire data set index. Access to the PDSE data set directory is serialized by a single lock to a root node of the data set index tree data structure providing either exclusive or shared access to the directory. Generally the PDSE directory lock is only held as needed and released upon completion of the input or output operation. In some cases, however, it is possible for a job to require the data set index lock for an inordinate amount of time thus denying access to the data set index by other processes.

SUMMARY

Provided are a computer program product, system, and method for managing multiple locks for data set members in a data set index. The data set has nodes including internal and leaf nodes forming a tree data structure representing all or a portion of the data set index for the data set. The leaf nodes include information on data set members and each internal node includes a pointer to at least one other of the internal nodes or the leaf nodes based on key values used to traverse the tree data structure to reach the leaf nodes that are used to access the members of the data set. A lock request is received for a requested lock on a requested data set member of the data set members. In response to determining that a current lock is set at a locked node comprising one of the nodes linked to a locked data set member of the data set members that prevents a grant of the requested lock, a determination is made as to whether there are different first and second descendant nodes from the locked node at a same level of the tree data structure linked to the requested data set member and the locked data set member, respectively. If so, the requested lock for the requested data set member is set at the first descendant node, the current lock is moved to the second descendant node for the locked data set member and the requested lock is granted to the lock request.

DETAILED DESCRIPTION

Described embodiments provide techniques for processing a data set index tree data structure to allow for multiple exclusive and shared locks to be granted with respect to different data set members by splitting the tree data structure. This splitting places locks for different lock requests on different sub-trees of the data set index tree providing links to the separately locked data set members. If the child nodes or data set members of a modified node are deleted or added, then a rebalance flag may be set at the modified node to rebalance the nodes and data set members in the sub-tree extending from the modified mode when the locks are released with respect to the modified node or sub-tree.

Figure 1:
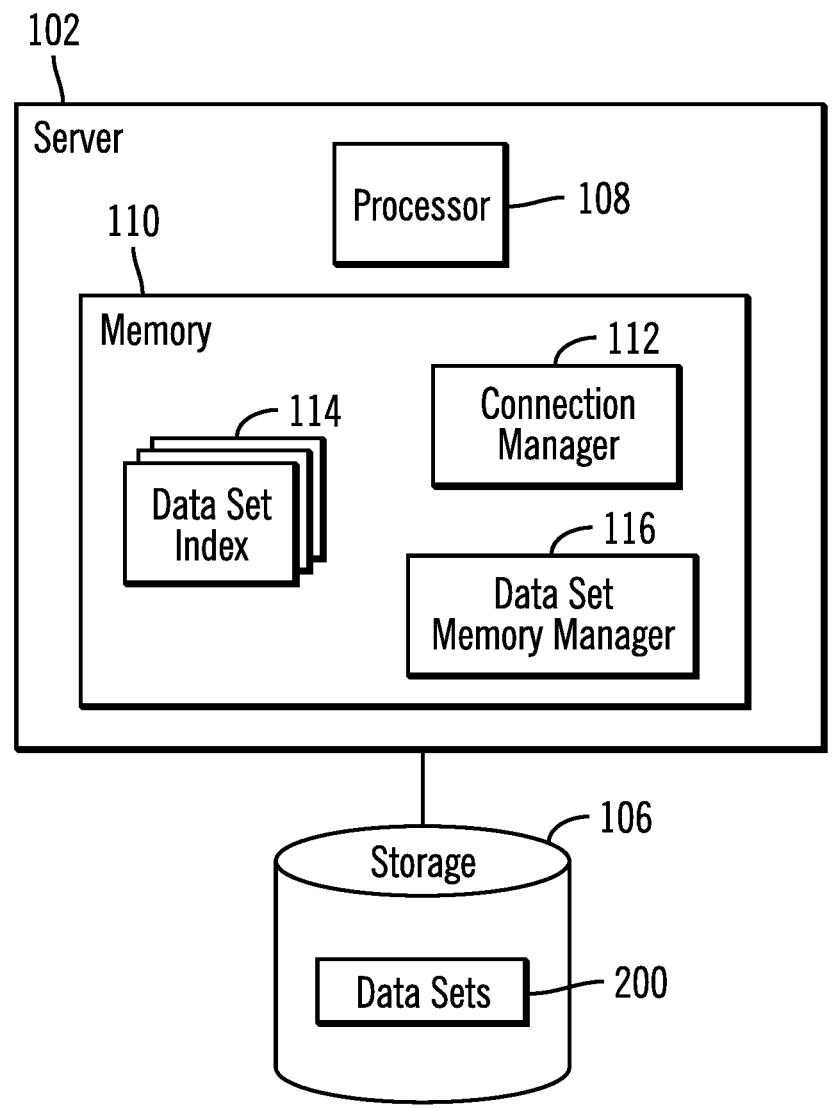
FIG. 1 illustrates an embodiment of a computing environment.

FIG. 1 illustrates an embodiment of a computing environment. A plurality of hosts (not shown) may submit read and write requests to a server 102 to access data in data sets 200 in a storage 106. The server 102 includes a processor 108 and a memory 110 having a connection manager 112 program to manage read and write access to the data sets 200. The connection manager 112 may load data set indexes 114 into the memory for the data sets 200 that are opened for access. A data set memory manager 116 manages the use of pages of data in the memory 110 that are allocated to the connection manager 112 for data set operations. A specific number of pages may be allocated for data set operations. The pages allocated for data sets remain allocated even if not used. If additional pages are needed, the data set memory manager 116 may request additional pages to be allocated for data set operations. A page may comprise a fixed sized page allocated to store the data set indexes 114 and data set members.

In one embodiment, the memory 110 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc. The storage 106 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The connection manager 112 and data set memory manager 116 may comprise one or more programs loaded into the memory 110 that are executed by the processor 108 or may be implemented in one or more hardware devices in the server 102, such as in Application Specific Integrated Circuits (ASIC).

Figure 2:
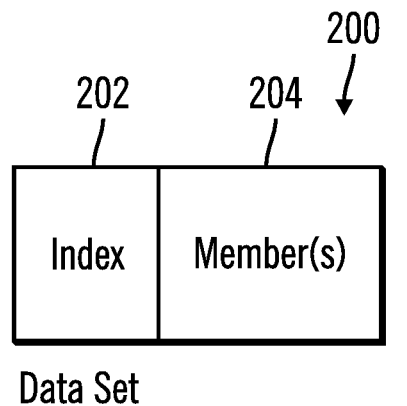
FIG. 2 illustrates an embodiment of a data set record as known in the prior art.

FIG. 2 illustrates an embodiment of a data set 200, as known in the prior art, which includes an index 202 providing a location in the data set 200 of one or more members 204. The index 114 comprises the index 202 loaded into the memory 110. A member comprises a range of tracks. In certain embodiments, the data sets 200 may comprise a Partitioned Data Set Extended (PDSE), where new data is written to the end of the data set and old versions of members are reused or deleted. In an alternative embodiment, the data sets 200 may comprise a type of data set other than a PDSE.

The data set index 114 (202) may be implemented as a representation of a tree structure having leaf nodes and internal nodes (also known as non-leaf nodes). There may be one page in the memory 110 allocated to each node, leaf and internal. Each leaf node may provide links to one or data set members 204 of a data set 200. The internal nodes include one or more keys and links to one or more internal nodes or leaf nodes, which in turn link to one or more data set members 204. The keys of the internal nodes are used to traverse the tree structure representing the data set index 114 to access the leaf nodes linking to the data set members 204. The keys in the internal nodes used to traverse the tree may comprise characters or character strings for member 204 names. Alternatively, the keys may comprise other values used to traverse the data set index 114 tree.

Figure 3:
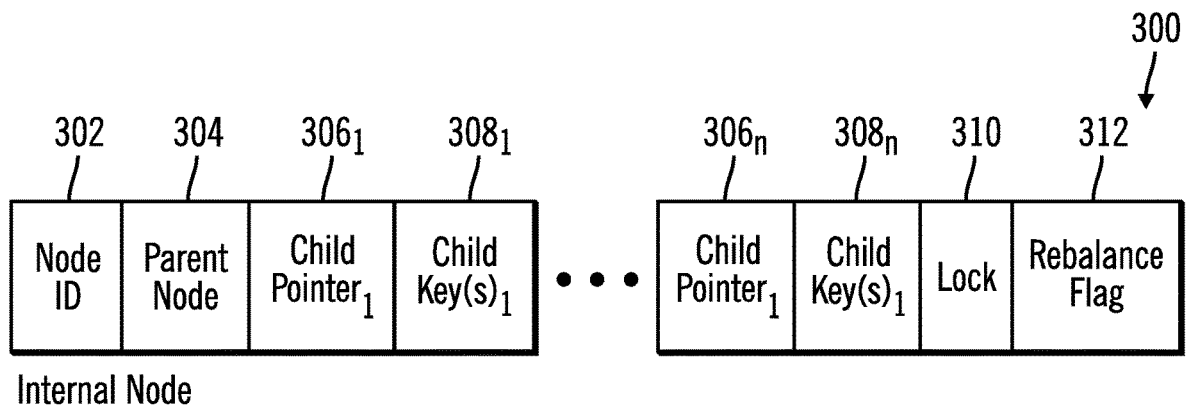
FIG. 3 illustrates an embodiment of a data structure to implement an internal node in a data set index tree data structure.

FIG. 3 illustrates an embodiment of information in a data structure maintained for an internal node 300, which may be implemented as a page in the memory 110, including a node identifier (ID) 302; a parent node 304 in the tree data structure comprising the root node or another internal node; for each of the one or more child nodes of the node 300, a child pointer $306_1 \ldots 306n$ pointing to the child node of the internal node 300 and child keys $308_1 \ldots 308_n$ used to determine the child node pointer to select at the internal node 300 to traverse; a lock 310 indicating a type of lock, if any, set for the node 300; and a rebalance flag 312 indicating whether a rebalance operation is to be performed at the node to rebalance nodes below that node.

Figure 4:
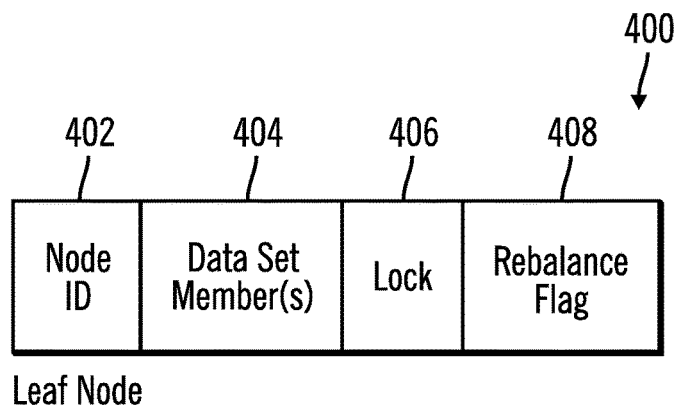
FIG. 4 illustrates an embodiment of a data structure to implement a leaf node in the data set index tree data structure.

FIG. 4 illustrates an embodiment of a leaf node 400, which may be implemented as a page in the memory 110, including a node ID 402 identifying the leaf node; one or more data set member descriptors 404 identifying data set members 204 assigned to the leaf node 400, if any; a lock 406 indicating a type of lock, if any, set for the leaf node 400; and a rebalance flag 410 indicating whether a rebalance operation is to be performed for the data set members 404.

Figure 5:
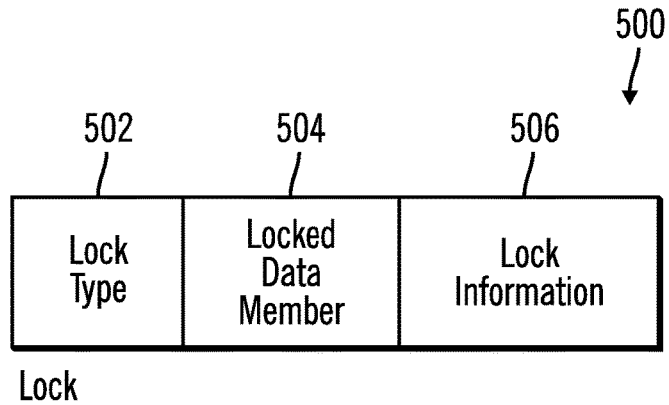
FIG. 5 illustrates an embodiment of a lock maintained at a node in the data set index tree.

FIG. 5 illustrates an embodiment of information maintained for a lock 500, such as one of the locks 310 and 408, including a lock type 502, a locked data set member 504 comprising the data set member subject to the lock, and lock information 506, such as information on the nodes that are traversed in the tree to access that data set member 504. The lock types 502 may include a propagated shared or exclusive lock type set at an internal node 300 and indicates that the lock propagates downward to one of the data set members 204 and a non-propagated shared or exclusive lock indicates that the lock applies to that node itself. A propagated or non-propagated exclusive lock at a node indicates that no other request can be made for a data set member that is accessed in the data set index through that exclusive locked node. A propagated or non-propagated shared lock at a node indicates that another shared request can be made to a data set member accessed through the shared locked node. For instance, a read, or open for input, operation to read one or more data set members 204 requires shared access and an operation to modify or update data set members 204, open of update, requires exclusive access.

Described embodiments allow multiple requests to obtain exclusive and shared access to data set members by splitting the tree and setting locks at different internal nodes of the data set index tree structure when data set members are on separate sub-trees of the data set index tree structure, such that multiple exclusive and shared locks may exist at the same time on the tree if they exist at nodes or on sub-trees that are not linked. To accomplish this, upon receiving a lock request for a requested data set member, if a current lock is set at a locked node for a locked data set member that prevents a grant of the requested lock, then a determination is made as to whether there are different first and second descendant nodes for the requested data set member and the locked data set member, respectively, at a same level of the tree data structure below the locked node. If so, then the requested lock for the requested data set member is set at the first descendant node and the current lock for the locked node is moved to the second descendant node for the locked data set member and the lock request is granted. The lock request is denied if there are no different first and second nodes for the requested data set member and the locked data set member from the locked node at a same level of the tree data structure.

Figure 6A:
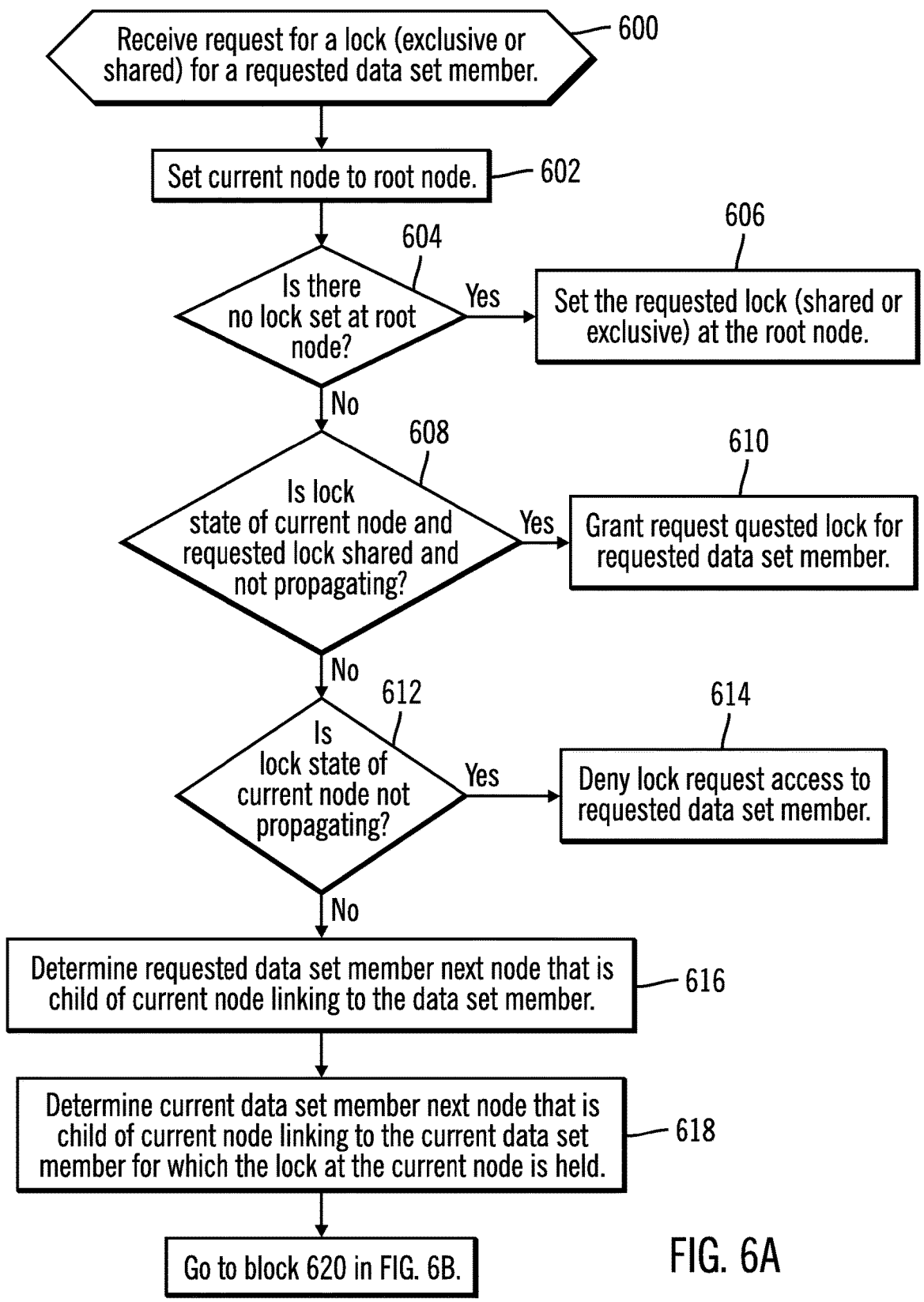
FIGS. 6a and 6b illustrate an embodiment of operations to use the data set index to process lock requests for data set members to allow multiple locks to be held.
Figure 6B:
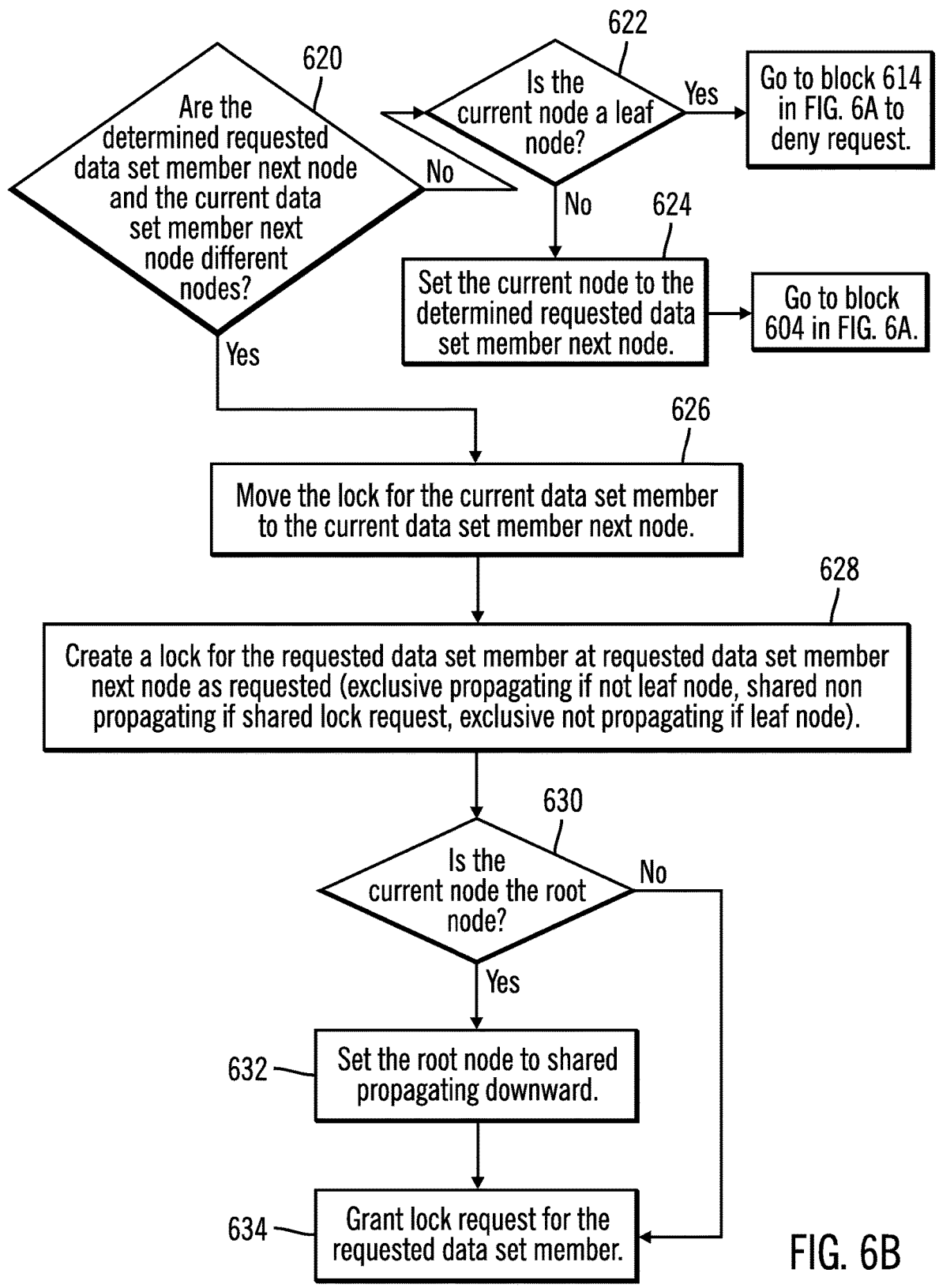
Figure 7:
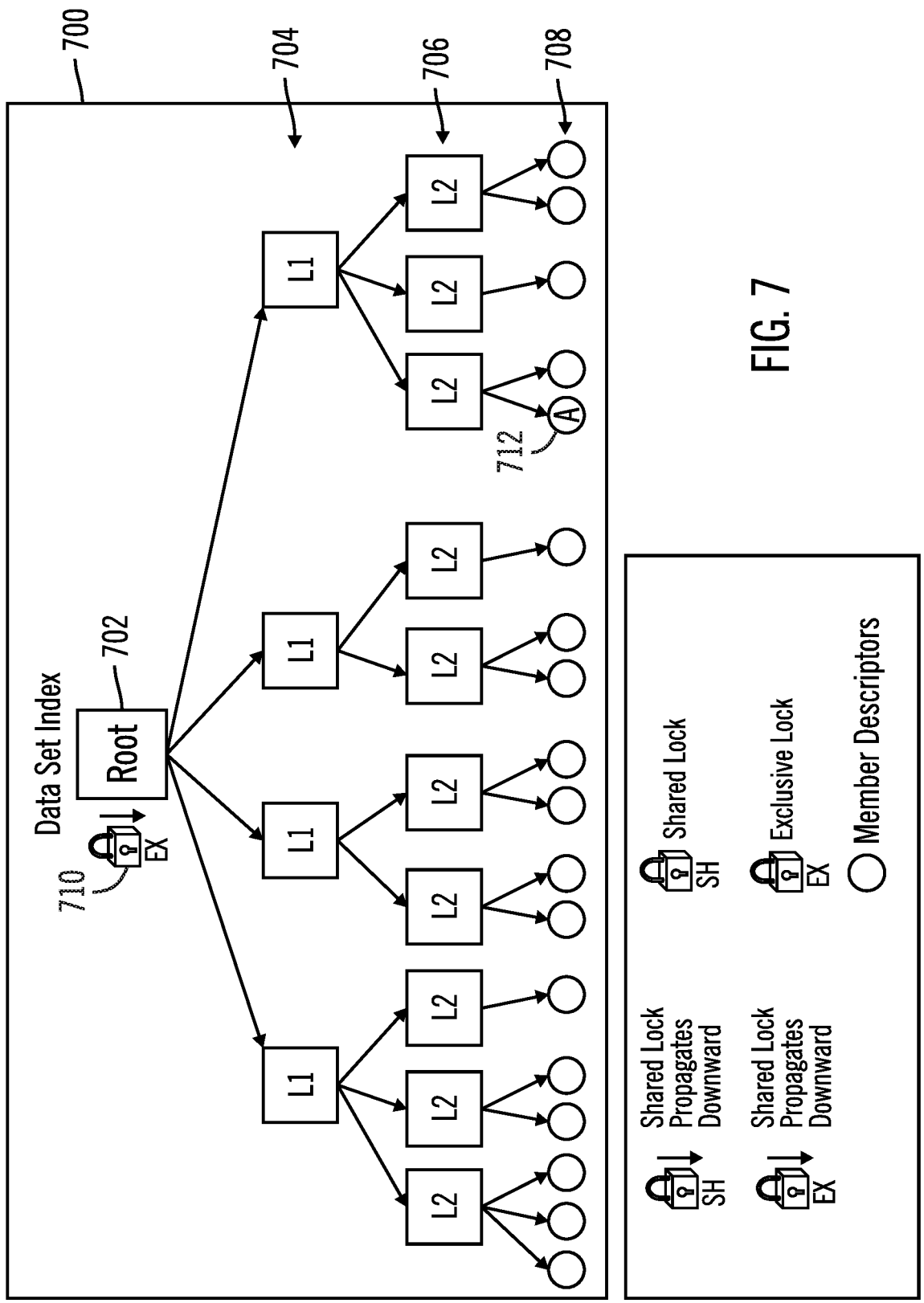
FIGS. 7-9 illustrate examples of states of the data set index tree data structure when processing lock requests according to the operations of FIGS. 6a and 6b.

FIGS. 6a and 6b illustrate an embodiment of operations performed by the connection manager 112 or some other module to manage the splitting of the data set index 114 tree data structure to allow multiple exclusive and shared locks to be granted for a data set 200. Upon receiving (at block 600) a request for a lock for a requested data set member 204 in the data set 200, the connection manager 112 sets (at block 602) a current node to the root node of the data set index 114. FIG. 7 illustrates an embodiment of a data set index 700 shown as a tree data structure having a root node 702, internal nodes L1 704 and leaf nodes L2 706 that link to one or more data set member descriptors 708. If (at block 604) there is no lock set at the root node 702, then the requested lock is set (at block 606) at the root node 702. If the requested lock is shared, then a non-propagating shared lock is set, whereas if the requested lock is exclusive a propagating exclusive lock is set. FIG. 7 illustrates the occurrence of block 606, where a request for an update exclusive lock for data set member "A" 712 results in an exclusive lock 710 being set at the root node 702 that propagates downward.

If (at block 608) the lock state of the current node is shared non-propagating and the requested lock is shared, then the connection manager 112 grants (at block 610) access to the shared lock for the requested data set member. If (at block 612) the lock of the current node is not propagating, then no further splitting is possible and the connection manager 112 denies (at block 614) the lock request for the data set member. If (at block 612) the current node lock state is propagating, i.e., representing a shared or exclusive lock held at the root or an internal node, then further splitting is possible. In such case, a determination is made (at block 616) of the requested data set member next node that is a child of the current node linking to the current data set member for which the lock at the current node is held. A determination is also made (at block 618) of the current data set member next node that is a child of the current node linking to the current data set member for which the lock at the current node is held.

With respect to FIG. 6b, if (at block 620), the determined data set member next node and the current data set member next node are the same node, i.e., not different nodes, then the lock cannot be split at the current level. In such case, if (at block 622) the current node is a leaf node, then further splitting at a lower level in the tree cannot be considered and control proceeds to block 614 in FIG. 6a to deny the lock request. If (at block 622) the current node is not a leaf node, then a further level can be considered for splitting, and the current node is set (at block 624) to the determined requested data set member next node, which is also the current data set member next node, and control proceeds to block 604 in FIG. 6a to determine whether the lock can be granted, i.e., split at a lower level or at the root node if all locks have since cleared.

If (at block 620) the determined data set member next node and the current data set member next node comprise different nodes, then the lock can be split and the lock for the current data set member at the current node is moved (at block 626) to the current data set member next node. Further, a lock for the requested data set member is created (at block 628) at requested data set member next node as requested (exclusive propagating if not leaf node, shared non propagating if shared lock request, exclusive not propagating if leaf node). If (at block 630) the current node is the root node, then the root node is set (at block 632) to have a shared propagating downward lock indicating that further exclusive and shared locks may exist at lower levels and the lock request is granted (at block 634) for the requested data set member. When setting a lock 500, the lock will record in the lock information 506 the nodes traversed to reach the data set member 504 subject to the lock.

Figure 8:
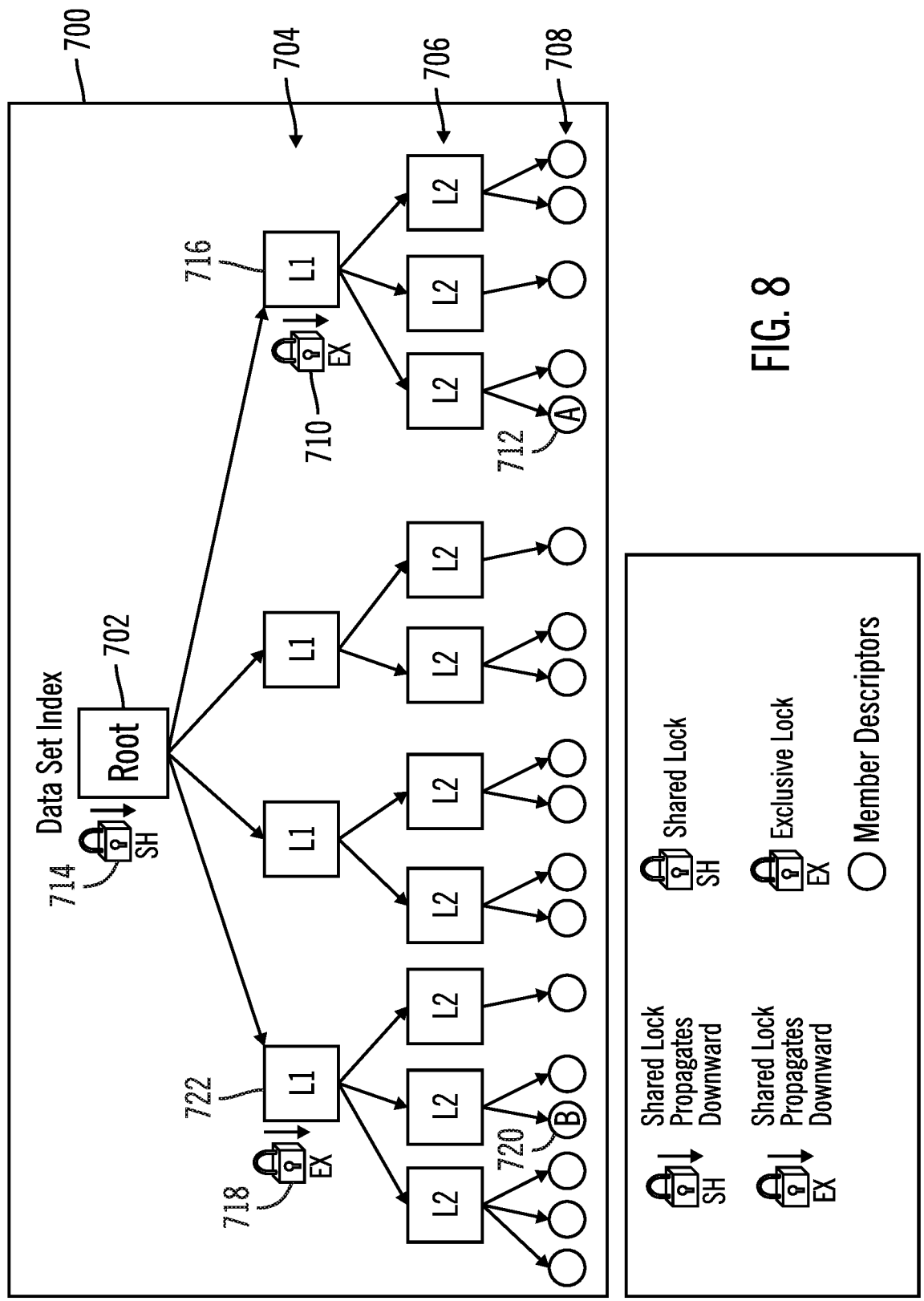

FIG. 8 illustrates a splitting of the tree 700 when an update request is received for data set member 720 while one exclusive lock 710 was held at the root node 702 to update the data set member A 712 on the tree as shown in FIG. 7. FIG. 8 shows the result of moving the lock 710 for data set member A to the node 716 according to the operation at block 626 in FIG. 6b, of setting an exclusive lock 718 for data set member B 720 at next node 722 according to the operation at block 628, and setting the root node 702 to having the propagating shared lock 714 according to the operation at block 632 in FIG. 6b.

Figure 9:
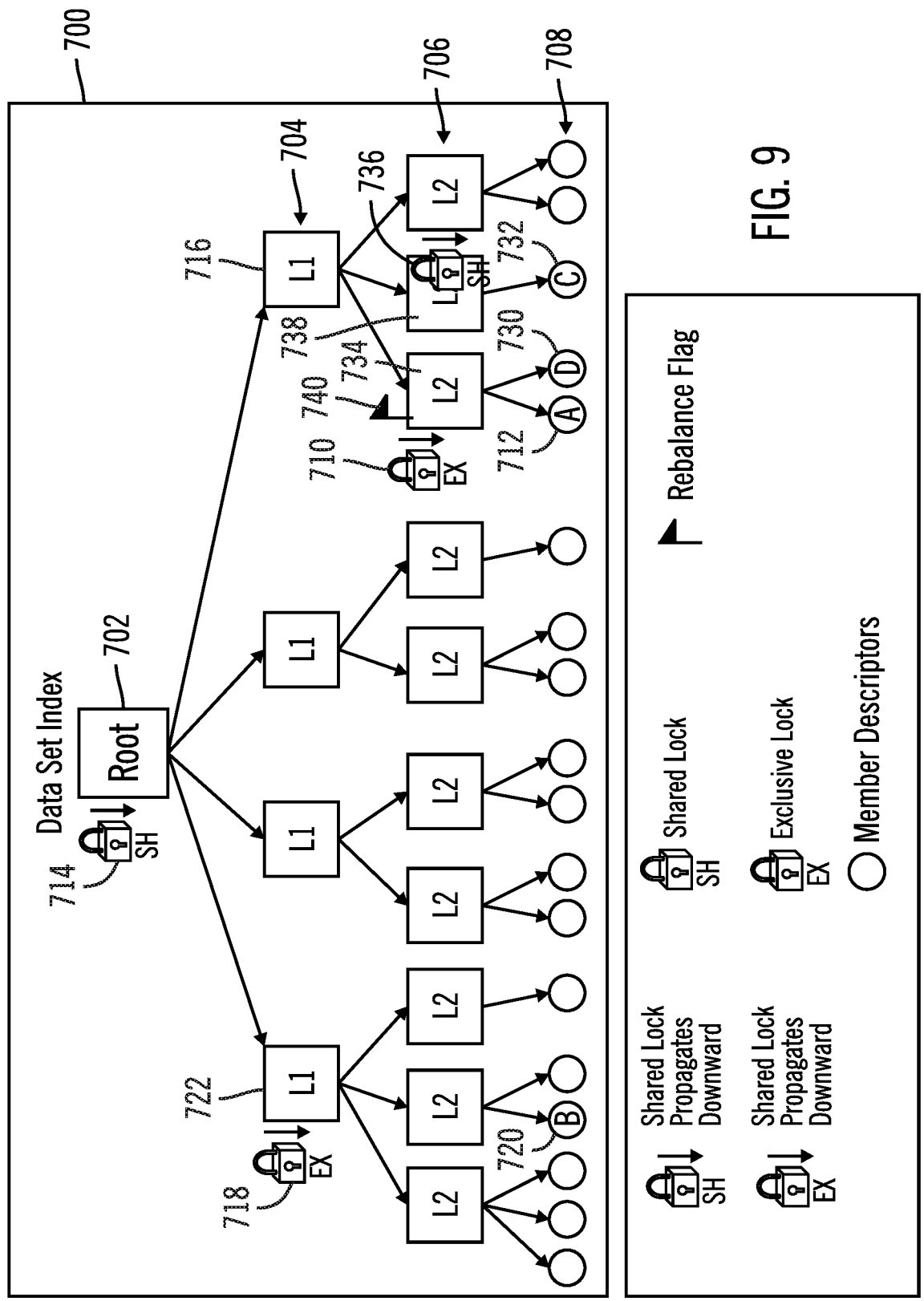

FIG. 9 illustrates an example of a situation where data set members A 712 and D 730 are marked for deletion and then a read or open for output operation is directed to data set member C 732 which requires a shared lock. The operations of FIGS. 6a and 6b would be performed to move the exclusive lock 710 to the node 734 and set a shared lock 736 at the node 738 for the read directed to data set member 732. Further since a delete is directed to data set members A 712 and D 730, a rebalance flag 740 is set at leaf node 734 of the deleted members to perform rebalancing due to the deletion of the data set members 712 and 730.

Figure 10:
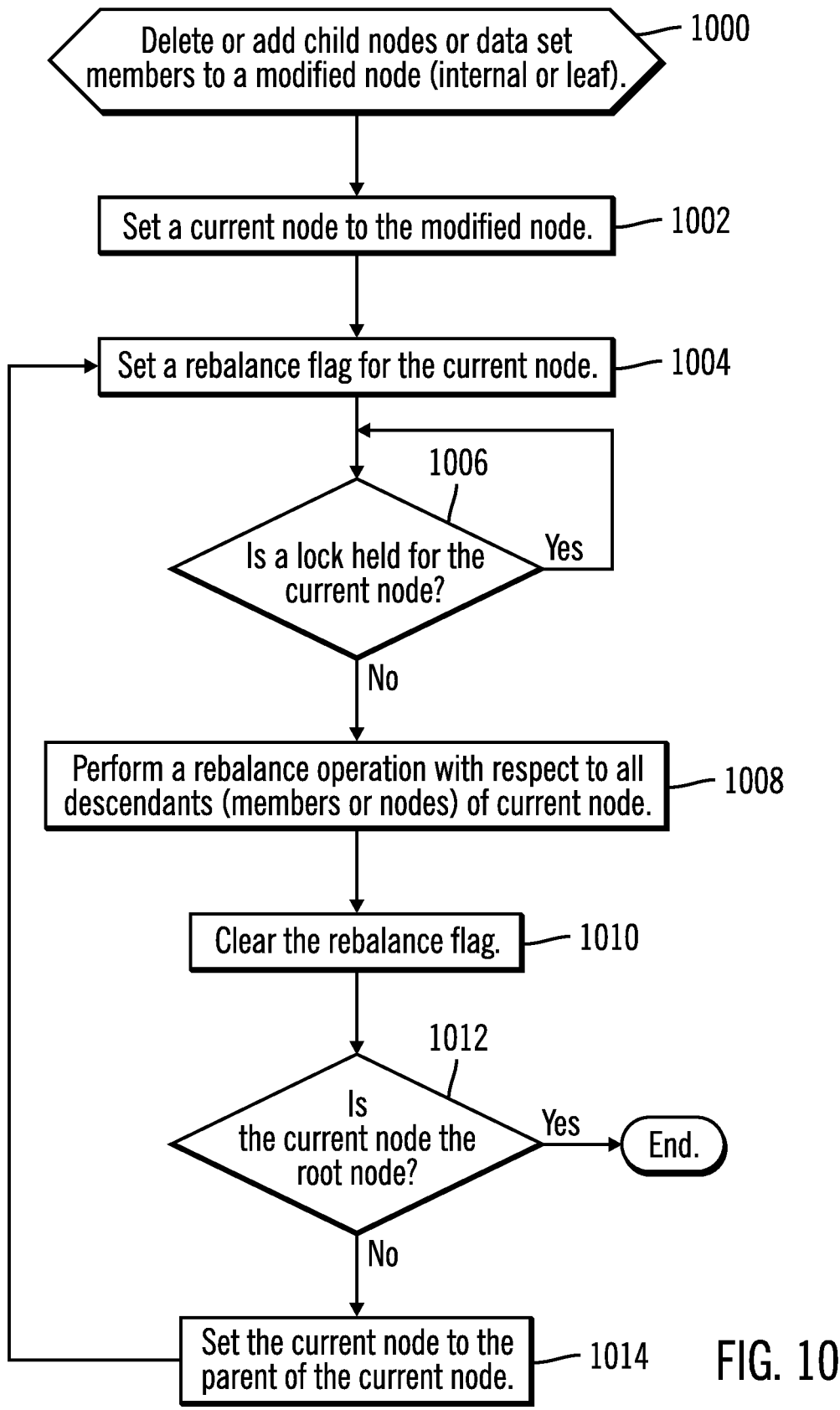
FIG. 10 illustrates an embodiment of operations to rebalance nodes of the data set index tree.

FIG. 10 illustrates an embodiment of operations performed by the connection manager 114 or other data set index manager to rebalance nodes. Upon deleting or adding child nodes or data set members (at block 1000) to a node referred to as a modified node, the connection manager 114 sets (at block 1002) a current node variable to the modified node and a rebalance flag 312 and 408 is set (at block 1004) for the current node. If (at block 1006) there is a lock held for the current node, then control proceeds to wait until the lock is released. Once (from the no ranch of block 1006) there are no locks held for the current node, then the connection manager 114 performs (at block 1008) a rebalance operation with respect to all descendant data set members and nodes linked to the current node at which the rebalance flag 312, 408 is set. The rebalance flag 312, 408 is cleared (at block 1010). If (at block 1012) the current node is the root node, then there is no more of the tree to rebalance and control ends. If (at block 1012) the current node is not the root node, then the connection manager 114 sets (at block 1014) the current node to the parent node of the current node and then proceeds back to block 1004 to set the rebalance flag 312 for the current node to perform rebalancing at a higher level in the tree data structure.

Figure 11:
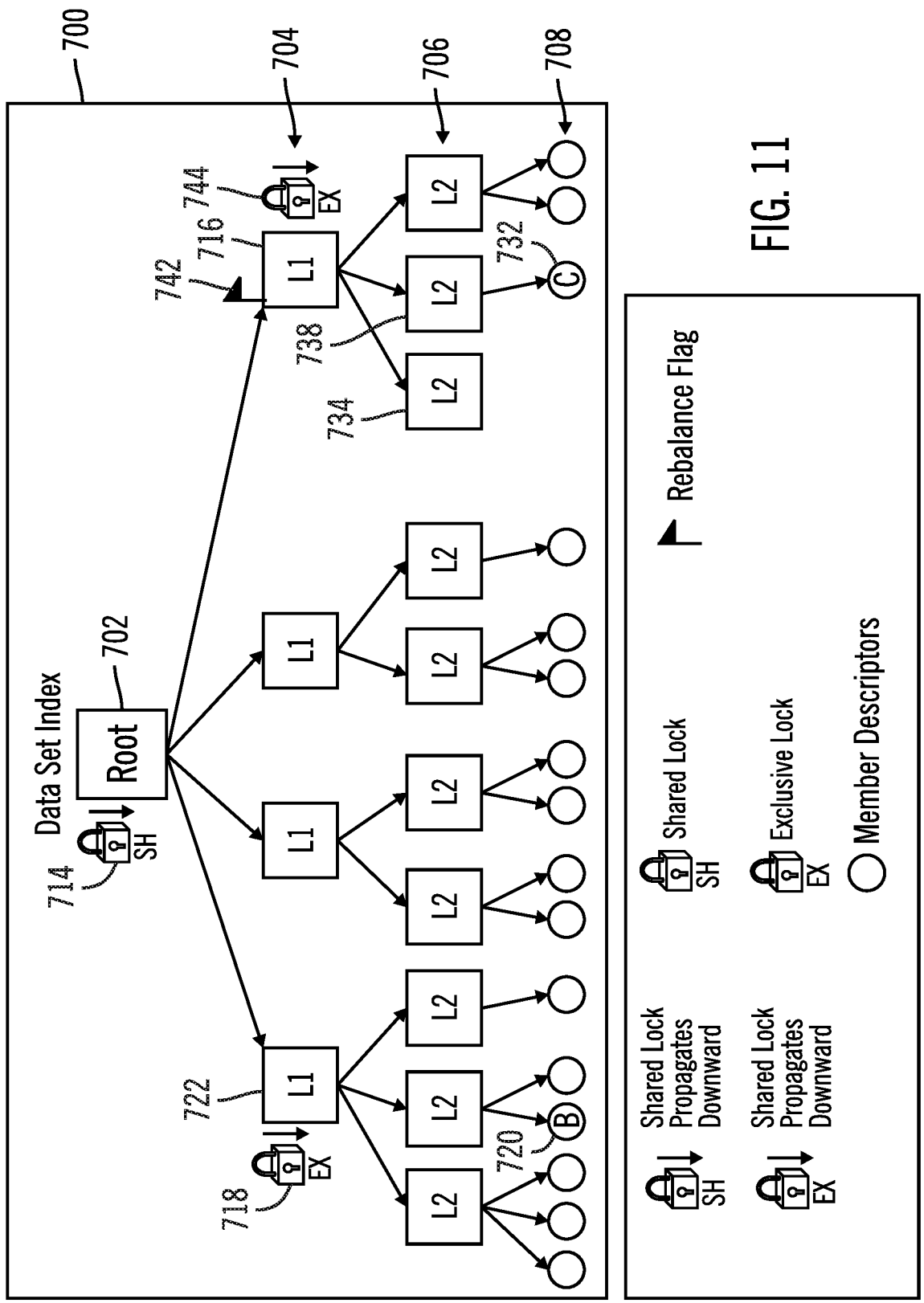
FIGS. 11 and 12 illustrate examples of states of the data set index when rebalancing nodes of the data set index tree according to the operations of FIG. 10.

FIG. 11 illustrates an example of the rebalancing operations of FIG. 10 when the data set members A 712 and D 730 (FIG. 9) are deleted and the lock 710 released and the shared lock 736 (FIG. 9) released after shared access to data set member 732 is closed. At this point, the rebalance flag 742 may be set at node 716 and an exclusive propagating lock 744 set at the node 716 so that rebalancing may occur at the nodes and data set members below node 716.

Figure 12:
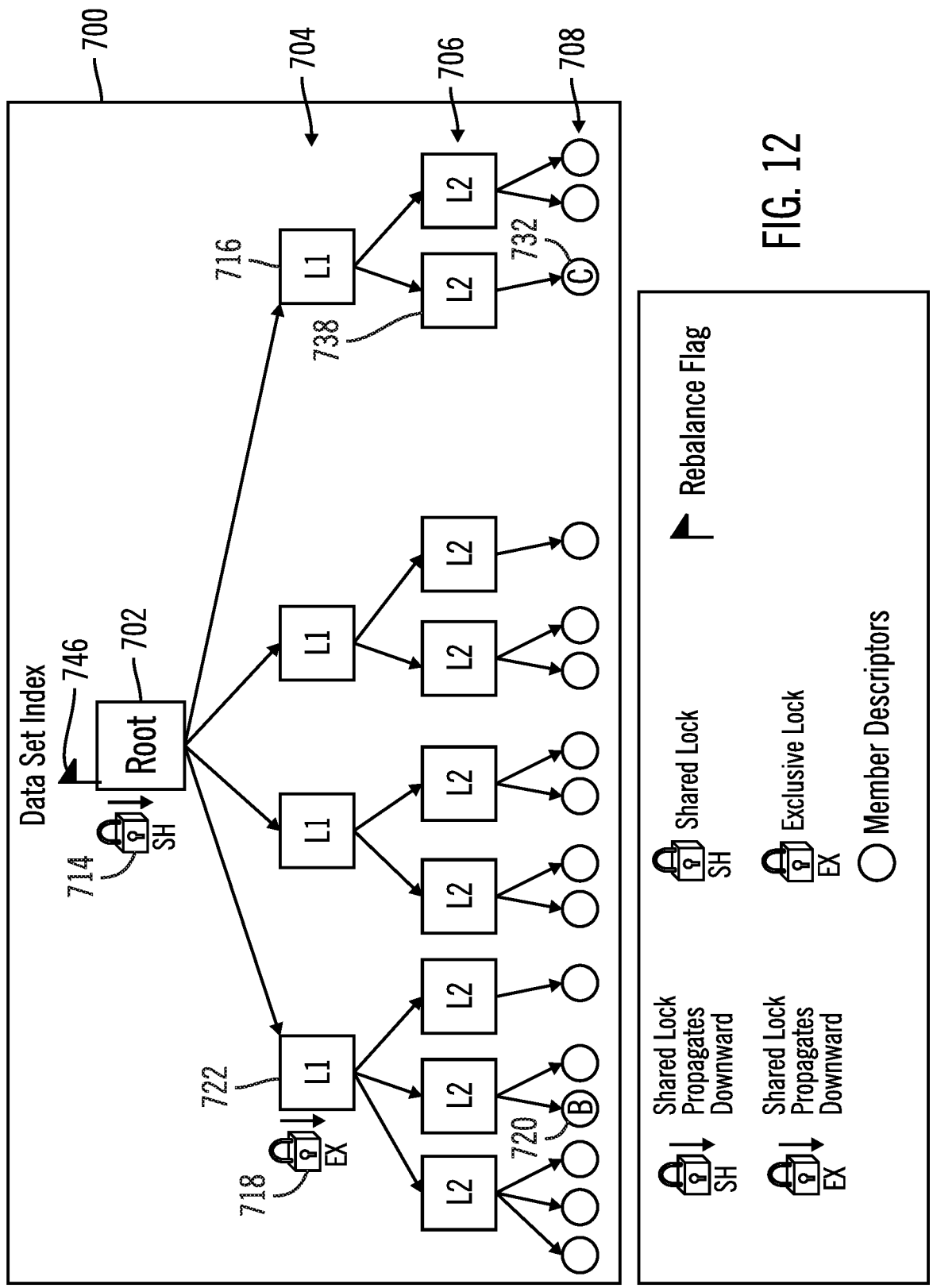

FIG. 12 illustrates an example of the rebalancing operations of FIG. 10 after the rebalancing occurs at node 716 as shown in FIG. 11, which results in the release of the exclusive lock 744 (FIG. 11) and the rebalance flag 742 (FIG. 11) cleared. A rebalance flag is then set 746 at the parent of the node 716, which is the root node 702. When the final lock 714 is removed from the root node 702, then the rebalancing can be performed with respect to the entire data set index 700 tree data structure.

Described embodiments allow the splitting of a tree data structure for locking to allow multiple locks, exclusive and shared, to be held for data set members if the data set members are linked to different sub-trees of the tree data structure. Multiple locks may be set at different sub-trees at different levels in the tree data structure without creating conflicts to allow multiple lock requests to be granted for one data set index. The split of the tree may occur at the highest level in the tree as possible such that the lock state of the sub-tree is compatible so that no incompatible lock states may be held on nodes pointing to members in leaf nodes below the split. Further, splitting the tree and setting the exclusive or shared locks as high in the tree as possible reduces the traverse of the tree nodes.

Yet further, the node at which the tree splits for locking will act as a new sub-root for the sub-tree for the locked data set member. When the tree splits, the new locks at the sub-roots of the sub-tree exist at the same level of the tree so that neither incompatibly locked tree is a sub-tree of the other. This limits the total number of existent incompatible locks to a maximum of the number of leaf nodes.

Further, with described embodiments, a rebalance flag is set after the child nodes or data set members of a modified node are modified, e.g., deleted or added, to indicate that the sub-tree from the modified node may require balancing. When an exclusive lock at the modified node is released, the descendant nodes and data set members of the modified node may be rebalanced, and the rebalance flag propagated upward in the tree to the parent node to cause further rebalancing at a higher level in the tree after the exclusive lock at the parent node is released and until the entire tree is rebalanced.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for accessing a computer memory to manage a data set stored in a storage, the computer program product comprising a non-transitory computer readable storage medium having computer readable program code embodied therein that executes to perform operations, the operations comprising:
    providing a data set index in the computer memory having nodes including internal and leaf nodes forming a tree data structure representing all or a portion of the data set index for the data set, wherein the leaf nodes include information on data set members, wherein each internal node includes a pointer to at least one other internal node of the internal nodes or at least one of the leaf nodes, wherein the internal nodes of the tree data structure are traversed based on key values to reach the leaf nodes that are used to access the data set members; and
    in response to a lock request for a requested lock on a requested data set member of the data set members, performing:
    determining a first descendant node that is both linked to the requested data set member and that is a descendant node of a locked node at which a current lock is set for a locked data set member;
    determining that the locked node has a second descendant node linked to the locked data set member that is different from the requested data set member;
    determining whether the first descendant node and the second descendant node are different; and
    setting the requested lock for the requested data set member at the first descendant node in response to determining that the first descendant node and the second descendant node comprise different nodes.

2. The computer program product of claim 1, wherein the requested lock is set at the first descendant node when the first and second descendant nodes are at a same level of the tree data structure.

3. The computer program product of claim 1, wherein the operations further comprise:
    in response to the locked node having the first and second descendant nodes linked to the requested data set member and the locked data set member, respectively, moving the current lock to the second descendant node for the locked data set member.

4. The computer program product of claim 1, wherein the operations further comprise:
    denying the lock request when there are no first and second descendant nodes from the locked node for the requested data set member and the locked data set member, respectively.

5. The computer program product of claim 1, wherein the operations further comprise:
    setting a shared lock on the locked node when the locked node comprises a root node of the tree data structure.

6. The computer program product of claim 1, wherein the operations further comprise:
    granting the requested lock to the lock request in response to the lock request comprising a shared lock request and the current lock comprising a shared lock.

7. The computer program product of claim 1, wherein the operations further comprise: denying the lock request in response to the current lock and the requested lock do not comprise shared locks and the current lock comprising a non-propagating lock, wherein the requested lock for the requested data set member is set at the first descendant node in response to the current lock comprising a propagating lock.

8. A system for accessing a computer memory to manage a data set stored in a storage, comprising:
    a processor; and a non-transitory computer readable storage medium having computer readable program code embodied executed by the processor to perform operations, the operations comprising:
    providing a data set index in the computer memory having nodes including internal and leaf nodes forming a tree data structure representing all or a portion of the data set index for the data set, wherein the leaf nodes include information on data set members, wherein each internal node includes a pointer to at least one other internal node of the internal nodes or at least one of the leaf nodes, wherein the internal nodes of the tree data structure are traversed based on key values to reach the leaf nodes that are used to access the data set members; and
    in response to a lock request for a requested lock on a requested data set member of the data set members, performing:
    determining a first descendant node that is both linked to the requested data set member and that is a descendant node of a locked node at which a current lock is set for a locked data set member;
    determining that the locked node has a second descendant node linked to the locked data set member that is different from the requested data set member;
    determining whether the first descendant node and the second descendant node are different; and setting the requested jock for the requested data set member at the first descendant node in response to determining that the first descendant node and the second descendant node comprise different nodes.

9. The system of claim 8, wherein the requested lock is set at the first descendant node when the first and second descendant nodes are at a same level of the tree data structure.

10. The system of claim 8, wherein the operations further comprise:
in response to the locked node having the first and second descendant nodes linked to the requested data set member and the locked data set member, respectively, moving the current lock to the second descendant node for the locked data set member.

11. The system of claim 8, wherein the operations further comprise:
denying the lock request when there are no first and second descendant nodes from the locked node for the requested data set member and the locked data set member, respectively.

12. The system of claim 8, wherein the operations further comprise:
setting a shared lock on the locked node when the locked node comprises a root node of the tree data structure.

13. The system of claim 8, wherein the operations further comprise:
granting the requested lock to the lock request in response to the lock request comprising a shared lock request and the current lock comprising a shared lock.

14. The system of claim 8, wherein the operations further comprise: denying the lock request in response to the current lock and the requested lock do not comprise shared locks and the current lock comprising a non-propagating lock, wherein the requested lock for the requested data set member is set at the first descendant node in response to the current lock comprising a propagating lock.

15. A method for accessing a computer memory to manage a data set stored in a storage, comprising:
providing, by a computer, a data set index in the computer memory having nodes including internal and leaf nodes forming a tree data structure representing all or a portion of the data set index for the data set, wherein the leaf nodes include information on data set members, wherein each internal node includes a pointer to at least one other internal node of the internal nodes or at least one of the leaf nodes, wherein the internal nodes of the tree data structure are traversed based on key values to reach the leaf nodes that are used to access the data set members; and
in response to a lock request for a requested lock on a requested data set member of the data set members, performing by the computer;
determining a first descendant node that is both linked to the requested data set member and that is a descendant node of a locked node at which a current lock is set for a locked data set member;
determining that the locked node has a second descendant node linked to the locked data set member that is different from the requested data set member;
determining whether the first descendant node and the second descendant node are different; and
setting the requested lock for the requested data set member at the first descendant node in response to determining that the first descendant node and the second descendant node comprise different nodes.

16. The method of claim 15, wherein the requested lock is set at the first descendant node when the first and second descendant nodes are at a same level of the tree data structure.

17. The method of claim 15, further comprising:
in response to the locked node having the first and second descendant nodes linked to the requested data set member and the locked data set member, respectively, moving the current lock to the second descendant node for the locked data set member.

18. The method of claim 15, further comprising:
denying the lock request when there are no first and second descendant nodes from the locked node for the requested data set member and the locked data set member, respectively.

19. The method of claim 15, further comprising:
setting a shared lock on the locked node when the locked node comprises a root node of the tree data structure.

20. The method of claim 15, further comprising:
granting the requested lock to the lock request in response to the lock request comprising a shared lock request and the current lock comprising a shared lock.

* * * * *